United States Patent

Murphy, Jr. et al.

[15] 3,661,590
[45] May 9, 1972

[54] TWO COMPONENT DIAZO-TYPE DEVELOPING PROCESS

[72] Inventors: William S. Murphy, Jr.; Edward Bialczak, both of Mount Prospect, Ill.

[73] Assignee: Addressograph-Multigraph Corporation, Mount Prospect, Ill.

[22] Filed: Aug. 14, 1970

[21] Appl. No.: 63,897

Related U.S. Application Data

[63] Continuation of Ser. No. 639,626, May 19, 1967, abandoned.

[52] U.S. Cl. ..................................96/49, 96/91
[51] Int. Cl. ........................G03c 5/34, G03c 1/60
[58] Field of Search ..........................96/49, 75, 91

[56] References Cited

UNITED STATES PATENTS

| | | | |
|---|---|---|---|
| 1,444,469 | 2/1923 | Kogel | 96/91 R |
| 1,628,279 | 5/1927 | Schmidt et al. | 96/91 R |
| 1,973,148 | 9/1934 | Kemmerich | 96/91 R |
| 2,308,058 | 1/1943 | Crowley et al. | 96/49 |
| 3,203,798 | 8/1965 | Muller | 96/49 |
| 3,224,878 | 12/1965 | Klimkowski et al. | 96/75 X |
| 3,382,070 | 5/1968 | Welch | 96/91 R |
| 3,248,220 | 4/1966 | Van Rhijn | 96/91 R |
| 3,446,620 | 5/1969 | Parker | 96/49 |
| 3,316,092 | 4/1967 | Klimkowski et al. | 96/91 R |

FOREIGN PATENTS OR APPLICATIONS

| | | | |
|---|---|---|---|
| 165,325 | 2/1950 | Austria | 96/49 |

OTHER PUBLICATIONS

Remy, H., " Treatise on Inorganic Chemistry," Vol. II, 1956. p. 454– 455 relied on.

*Primary Examiner*—Charles L. Bowers, Jr.

[57] ABSTRACT

A two component diazo-type copy sheet having a light sensitive coating formulation which includes an azo coupling component, a coupling diazo compound and a metal salt such as cadmium sulfate, manganese sulfate, nickel sulfate and zinc sulfate which acts to substantially speed up the azo dye formation upon the application of controlled amounts of an organic amine. The metal salt is present in the range of 1 to 3 percent by weight of the sensitizing solution. Ethanolamine is typical of the developing liquids.

5 Claims, No Drawings

TWO COMPONENT DIAZO-TYPE DEVELOPING PROCESS

REFERENCE TO COPENDING APPLICATION

This application is a continuation of my copending application, Ser. No. 639,626, filed May 19, 1967 now abandoned.

BACKGROUND OF THE INVENTION

This invention relates to two component diazo-type materials, and more particularly to additives capable of increasing the speed of the azo-dye-formation upon the application of an organic amine developing solution.

The processing technique for developing the two component diazo-type papers of this invention involves exposing the light sensitive material through a translucent original and then developing the exposed sheet by applying a controlled amount of an organic amine to the surface. In the presence of the organic amine the unexposed light sensitive composition, comprising a coupling diazo compound and an azo coupling component, reacts to form an azo dye image.

The use of the conventional two component diazo-type materials which are developed by ammonia gas are not suitable as a copying material requiring the application of an organic amine. The rate of azo-dye-formation, i.e., the coupling speed in the environment of an organic amine, applied to a two component diazo-type material, is quite slow, requiring anywhere from 1 to 5 minutes for the image to reach its maximum density.

It is a general object of this invention to provide an improved two component diazo-type material which has good shelf life stability and develops an azo dye image rapidly upon the application of an organic amine.

It is a specific object of this invention to provide a two component diazo-type material capable of forming an azo dye image instantaneously upon the application of an organic amine containing a metal salt additive.

Other objects and advantages will occur to those skilled in the art after having reference to the following detailed description.

The invention comprises the addition of a metal sulfate selected from the group consisting of cadmium sulfate, nickel sulfate, manganese sulfate and zinc sulfate to a two component diazo-type material which have been found to substantially increase the speed of azo dye image formation upon the application of a developing solution comprising an organic amine.

The precise mechanism whereby the metal sulfate causes the speed of the coupling reaction to be greatly increased is not fully understood. It is believed that it forms a complex salt with the coupling agents and in the environment of the process of this invention dissociates in the presence of an organic amine. A detailed description of the technique of developing two component papers using liquid developing solutions is disclosed in U.S. Pat. application, Ser. No. 440,752, filed in the name of Konrad Parker and assigned to the same assignee as the instant application now U.S. Pat. No. 3,446,620.

The salts of this invention have been suggested as stabilizing agents for heat-developable diazo-type photoprinting compositions. U.S. Pat. No. 3,224,878, granted Dec. 21, 1965 to Robert J. Klimkowski and Luigi Amariti, discloses the use of the metal salt for diazo-type materials having included therein a compound producing an alkaline reaction when heated. These diazo-type heat-developable materials are believed stabilized by the addition of the metal salts which are believed to complex with the compound producing an alkaline reaction so that at room temperature it is unavailable to produce ammonia and thereby prematurely cause an azo dye image.

SUMMARY OF THE INVENTION:

In practicing the invention, a light sensitive aqueous coating comprising a coupling diazo compound, an azo coupling component and a metal salt comprising from 1 – 3 percent by weight of the coating formulation. The light sensitive diazo compounds which are useful in the gas developed two component diazo systems can be used to advantage in the diazo-type materials of this invention. Examples of such compounds are the diazonium salts obtained by the diazotization of the following amines:

p-amino-N,N-diethylaniline
p-amino-N-ethylaniline
p-amino-N-ethyl-N-3-hydroxyethylaniline
p-amino-N-methyl-N-3-hydroxyethylaniline
p-amino-N,N-di(3-hydroxyethyl)aniline
p-amino-m-ethoxy-N,N-diethylaniline
p-amino-N-ethyl-o-toluidine
p-amino-N-ethyl-m-toluidine
p-amino-N,N-diethyl-m-toluidine
p-amino-N-ethyl-N-3-hydroxyethyl-m-toluidine
N-p-aminophenylmorpholine
1-amino-2,5-diethoxy-4-morpholinobenzene The preferred amine is 1-amino-2,5-diethoxy-4-morpholinobenzene.

Generally, a number of coupling components may be employed. The preferred coupling component that may be employed to produce the dye image is 2,4-dihydroxynaphtalene-6-sulfonic acid. Other known couplers may be employed, such as resorcinol, acetoacetanilide, 4-chlororesorcinol and diacetoacetylethylenediamine. It is, of course, desirable to select coupling components which are readily stabilized against premature reaction with the diazo compounds until the copy material is treated with the liquid developing solution comprising the organic amine.

It is conventional in the formulation of the sensitizing coatings to include an acid component to prevent precoupling and premature dye formation by maintaining the pH of the coating after it has been applied below the level required for coupling. Sulfonic acid derivatives, such as metabenzenedisulfonic acid, are employed as the preferred acid components. Other acids may be used to produce the desired pH such as:

maleic acid
malonic acid
ethanesulfonic acid
benzenesulfonic acid
oxalic acid
citric acid
tartaric acid
latic acid The final component added to the composition is a metal salt, such as cadmium sulfate, manganese sulfate, nickel sulfate and zinc sulfate. It is the addition of the heavy metal salt which greatly speeds up the coupling reaction in the environment wherein the exposed copy sheet is developed by the application of controlled amounts of an organic amine developer solution not exceeding 3 grams per square meter of copy surface, said solution containing at least 20 percent by weight of an organic amine.

The following amines have been emminently successful in developing two components of diazo-type materials:

monoethanolamine
isopropanolamine
2-(2-aminoethoxy) ethanol
triethanolamine
diethanolamine
2-amino, -2-methyl, 1-propanol
N-methylethanolamine
dimethyl-ethanolamine
monoisopropanol amine
hexylamine
cyclohexylamine

DESCRIPTION OF THE PREFERRED EMBODIMENTS:

The following examples of diazo-type materials are given for the purposes of illustrating preferred embodiments of the invention. It will be understood, however, that this invention is not limited to these illustrative embodiments of sensitizing solutions useful in practicing this invention.

EXAMPLE I

A diazo-type paper was prepared by applying a two component sensitizing solution at the rate of 15 grams per m² to a paper base support, such as a direct process sulfite stock, 20 pound-basis weight (17 × 22–500) having the following formulation:

| | |
|---|---|
| diethyleneglycol | 35 cc |
| metabenzenedisulfonic acid | 10 g |
| cadmium sulfate | 10 g |
| 2,3 dihydroxynaphthalene-6-sulfonic acid | 10 g |
| 2,5 diethoxy-4-morpholinobenzene diazonium chloride chlorozincate | 15 g |
| thiourea | 25 g |
| water to make | 1000 cc |

The coating solution was applied using conventional coating equipment and the coated material was passed through a drying chamber in order to evaporate the excess moisture.

The sensitized paper was exposed to actinic radiation by contact exposure through a transparent or translucent original creating a pattern on the paper.

The exposed sensitized paper was then developed by the application of an amine solution having the following formula:

| | |
|---|---|
| monoethanolamine | 60% |
| hexylene glycol | 20% |
| water | 20% |

The developer composition was applied under controlled conditions so that the amount deposited on the sensitized surface did not exceed 3 g per m². Immediately upon the application of the developer composition the portion of the sensitized material which was not exposed to actinic radiation began to develop in a blue colored azo dye image achieving maximum density within 15 – 30 seconds after contact with the developer solution. Significantly, in the 5 second period, immediately following the application of the liquid, color development was substantial so that the density of the azo dye image attained a level which is 75 – 85 percent of its maximum density.

EXAMPLE II

The light sensitive diazo-type material prepared in this example follows the procedure in the formulation as described in Example I, with the exception that zinc sulfate, in the same amount, was substituted for cadmium sulfate.

EXAMPLE III

A base support of the type described in Example I was coated with a light sensitive diazo-type material having the following formula:

| | |
|---|---|
| diethylene glycol | 35 cc |
| metabenzenedisulfonic acid | 10 g |
| cadmium sulfate | 10 g |
| 2,3-dihydroxynaphthalene-6-sulfonic acid | 10 g |
| 2,5 diethoxy-4-morpholinobenzene diazonium chloride chlorozincate | 10 g |
| thiourea | 15 g |
| naphtalene trisulfonic acid (sodium salt) | 15 g |
| diresorcinol | 1 g |
| water to make | 1000 cc |

The above composition, when developed with an organic amine, such as described in Example I, gave a black dye line. A study of the speed with which the azo dye image developes revealed greater overall image density as compared to prior art stabilizers, such as zinc chloride reaching 75 – 90 percent of the maximum density within the first 5 seconds after application of the organic amine.

EXAMPLE IV

The light sensitive diazo-type material prepared in this example follows the preparation and formula of Example III, with the exception that 15 g of nickel sulfate were employed.

Comparable results regarding speed of development were obtained as in previous examples.

It will be observed that the formulations of the sensitizing compositions of the instant two component papers have eliminated the use of the heretofore widely used zinc chloride salt as a stabilizer. Such paper, using a zinc chloride stabilizer, provides a light sensitive material which is slow to respond to the developing action of the organic amines. By comparison, the zinc chloride system produces azo dye images of low density generally. Further, the zinc chloride stabilizer in the first second after application attains only a small percentage of the ultimate dye density, being most active after 5 – 30 seconds. In the case of the salts of the instant invention there is an immediate dye formation which reaches its maximum density in about 15 – 30 seconds.

The detailed description presented herein demonstrates the advantage and greatly improved results in image development using two component diazo-type materials developed by the application of an organic amine-containing liquid developer. The success of such an imaging process depends on the azo dye formation reaching a high density level in the early seconds after the application of the organic amine and undergoing a slower increase in azo dye formation from 10 – 30 seconds after application, reaching a maximum in about 1 minute.

In the instant invention the metal salts are relied upon primarily to complex with coupling compounds which complex releases the coupler when the organic amine is applied to the exposed sheet.

We claim:

1. The method of making a diazo-type copy of a translucent graphic original wherein the azo dye image formation attains about 75 percent of its maximum attainable density in about 5 seconds after development and attains maximum density in about 1 minute comprising the steps of:
   a. exposing the two-component diazotype material to actinic radiation through said translucent original, said diazo-type material comprising a base support having applied thereon a composition comprising a light-sensitive diazonium compound, an azo coupling component and cadmium sulfate, wherein said cadmium sulfate is present in an amount ranging from 1 to 3 percent by weight of said sensitizing composition;
   b. developing the exposed diazotype material by applying a developer solution containing at least 20 percent by weight of an organic amine.

2. The method of developing a light sensitive diazotype material as claimed in claim 1, wherein the organic amine is selected from the group consisting of monoethanolamine, diethanolamine, diglycolamine, monoisopropanolamine, methylethanolamine and dimethylethanolamine and triethanolamine.

3. The method of developing a light sensitive diazo-type material as claimed in claim 1, wherein the amount of developer containing an organic amine is in the range of 0.5 to 3.0 grams per square meter of diazo-type material.

4. The method as claimed in claim 1, wherein the metal salt comprises from 1 to 3 percent by weight of said light sensitive composition.

5. The method as claimed in claim 1, wherein the organic amine is applied at a rate not in excess of 3 grams per square meter of the copy sheet.

* * * * *